(12) United States Patent
Kim et al.

(10) Patent No.: US 8,829,849 B2
(45) Date of Patent: Sep. 9, 2014

(54) ROOF TYPE CHARGING APPARATUS USING RESONANT POWER TRANSMISSION

(75) Inventors: Dong Zo Kim, Yongin-si (KR); Sang Wook Kwon, Seongnam-si (KR); Yun Kwon Park, Dongducheon-si (KR); Eun Seok Park, Suwon-si (KR); Young Tack Hong, Seongnam-si (KR); Young Ho Ryu, Yongin-si (KR); Nam Yun Kim, Seoul (KR); Jin Sung Choi, Gimpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 13/210,233

(22) Filed: Aug. 15, 2011

(65) Prior Publication Data

US 2012/0056579 A1 Mar. 8, 2012

(30) Foreign Application Priority Data

Sep. 8, 2010 (KR) .................. 10-2010-0087939

(51) Int. Cl.
*H02J 7/00* (2006.01)
(52) U.S. Cl.
USPC .................... 320/108; 320/114; 320/115
(58) Field of Classification Search
USPC ............ 320/108, 114, 115; 340/854.6, 854.8, 340/855.8; 455/269, 270, 573
See application file for complete search history.

(56) References Cited

U.S. PATENT DOCUMENTS

| 5,821,731 | A | * | 10/1998 | Kuki et al. ............. 320/108 |
| 7,504,802 | B2 | * | 3/2009 | Bersenev ............... 320/108 |
| 7,622,891 | B2 | * | 11/2009 | Cheng et al. ............ 320/108 |
| 7,916,467 | B2 | * | 3/2011 | Hotelling et al. ........ 361/679.41 |
| 2003/0173473 | A1 | * | 9/2003 | Mackay et al. .......... 248/125.7 |
| 2008/0014897 | A1 | * | 1/2008 | Cook et al. ............. 455/343.1 |
| 2009/0218985 | A1 | * | 9/2009 | Hallett ................ 320/108 |
| 2009/0251101 | A1 | * | 10/2009 | Phillips et al. ......... 320/108 |
| 2010/0314038 | A1 | * | 12/2010 | Tanuma ................ 156/249 |
| 2010/0315038 | A1 | * | 12/2010 | Terao et al. ............ 320/108 |
| 2011/0018499 | A1 | * | 1/2011 | Fujiwara .............. 320/108 |
| 2011/0127953 | A1 | * | 6/2011 | Walley et al. .......... 320/108 |
| 2012/0153893 | A1 | * | 6/2012 | Schatz et al. ........... 320/108 |

FOREIGN PATENT DOCUMENTS

| JP | 2006-314181 | 11/2006 |
| JP | 2008-172872 | 7/2008 |
| JP | 2008-312294 | 12/2008 |
| KR | 10-2005-0096068 | 10/2005 |
| KR | 20-0411082 | 3/2006 |
| KR | 10-2007-0028896 | 3/2007 |

* cited by examiner

*Primary Examiner* — Richard V Muralidar
*Assistant Examiner* — Michael Dibenedetto
(74) *Attorney, Agent, or Firm* — NSIP Law

(57) ABSTRACT

Provided is a roof-type charging apparatus that charges multi-target device, while transmitting a resonance power. A roof-type charging apparatus using resonance power transmission includes a source resonance unit configured to transmit resonance power including a source resonator having a generally planar loop configuration and defining a space therein; a receiving unit configured to receive the resonance power transmitted from the source resonator; and a connecting unit configured to separate the source resonator and the receiving unit by a predetermined distance.

22 Claims, 18 Drawing Sheets

800

$$\omega_{MZR} = \frac{1}{\sqrt{L_R C_L}}$$

ROOF TYPE CHARGING APPARATUS USING RESONANT POWER TRANSMISSION

CROSS-REFERENCE TO RELATED APPLICATION(S)

This application claims the benefit under 35 U.S.C. §119 (a) of Korean Patent Application No. 10-2010-0087939, filed on Sep. 8, 2010, in the Korean Intellectual Property Office, the entire disclosure of which is incorporated herein by reference for all purposes.

TECHNICAL FIELD

The following description relates to apparatuses and method for charging a multi-target device, while transmitting a resonance power.

BACKGROUND

As demand for portable electrical devices has increased, use of wired power supplies has become inconvenient. Studies on wireless power transmission have been conducted to overcome inconveniences of wired power supplies and the limited capacity of conventional batteries. Commonly used mobile devices may perform wireless charging based on an induction scheme that uses a frequency, for example, ranging from dozens of kilohertz (kHz) to hundreds of kHz. The induction scheme may be efficient in wireless power transmission. However, to perform conventional wireless power transmission, induction coils are close to each other, and a location of a center of a wireless power transmission coil may be the same as a wireless power reception coil. Thus, the induction scheme may have a limited charging scope, and may not be able to perform charging that simultaneously charges a plurality of mobile devices using a single wireless power transmission coil.

SUMMARY

According to an aspect, a roof-type charging apparatus using resonance power transmission comprises: a source resonance unit configured to transmit resonance power including a source resonator having a generally planar loop configuration and defining a space therein; a receiving unit configured to receive the resonance power transmitted from the source resonator; and a connecting unit configured to separate the source resonator and the receiving unit by a predetermined distance.

According to an aspect, the source resonator and the receiving unit are positioned generally parallel with respect to one another.

According to an aspect, the source resonator is one of: square-shaped, rectangular-shaped, circle-shaped, oval-shaped, elliptical-shaped, triangle-shaped, octagon-shaped and polygon-shaped.

According to an aspect, the source resonator defines an effective charging radius of the source resonator.

According to an aspect, a target resonator that receives the resonance power transmission is positioned inside the effective charging radius of the source resonator.

According to an aspect, the apparatus further comprises: an input power unit configured to generate a resonance power based on a resonance frequency, and to provide the resonance power to the source resonator.

According to an aspect, the input power unit is located below the space defined by the source resonator.

According to an aspect, the apparatus further comprises: a matching unit configured to match a coupling impedance of the source resonator and a target resonator that receives the resonance power transmission.

According to an aspect, the matching unit is positioned in the space defined by the source resonator.

According to an aspect, the source resonance unit includes a frame configured to connect the source resonator to the connecting unit.

According to an aspect, the apparatus further comprises: a power converter configured to convert alternating current (AC) power of a voltage source to a direct current (DC) power.

According to an aspect, the connecting unit comprises a hollow cylinder, and a cable passing through the inside of the hollow cylinder.

According to an aspect, the hollow cylinder is formed of an insulative material.

According to an aspect, the predetermined distance is adjustable thereby providing impedance matching between the source resonator and a target resonator that receives the resonance power transmission.

According to an aspect, the source resonance unit includes an extension controller configured to adjust an effective charging radius of the source resonator.

According to an aspect, the apparatus further comprises: a supporting unit configured to support the apparatus.

According to an aspect, a method of transmitting resonance power comprises: transmitting resonance power using a source resonator having a generally planar loop configuration defining a space therein; and receiving with a receiving unit the resonance power transmitted from the source resonator, wherein the source resonator and the receiving unit are separated by a predetermined distance.

According to an aspect, the source resonator is one of: square-shaped, rectangular-shaped, circle-shaped, triangle-shaped, octagon-shaped and polygon-shaped.

According to an aspect, the source resonator defines an effective charging radius of the source resonator.

According to an aspect, a target resonator that receives the resonance power transmission is positioned inside the effective charging radius of the source resonator.

According to an aspect, the method further comprises: adjusting the predetermined distance to provide impedance matching between the source resonator and a target resonator that receives the resonance power transmission.

According to an aspect, the method further comprises: adjusting an effective charging radius of the source resonator.

According to an aspect, a roof-type charging apparatus using resonance power transmission comprises: a source resonance unit configured to transmit resonance power including a source resonator having a generally planar loop configuration and defining a space therein; a receiving unit configured to receive the resonance power transmitted from the source resonator; a matching unit located in a predetermined area of a frame of the source resonator and configured to match, to a predetermined value, a coupling impedance between the source resonator and at least one target resonator that receives the resonance power transmission; an input power unit configured to generate resonance power based on a resonance frequency, and to provide the resonance power to the source resonator; a connecting unit configured to separate the source resonator and the receiving unit by a predetermined distance; and a supporting unit connected to the input power unit and configured to support the roof-type charging apparatus.

According to an aspect, a source resonance unit configured to transmit resonance power comprises: a source resonator having a generally planar loop configuration and defining a space therein.

Other features and aspects may be apparent from the following detailed description, the drawings, and the claims.

Figure 1:
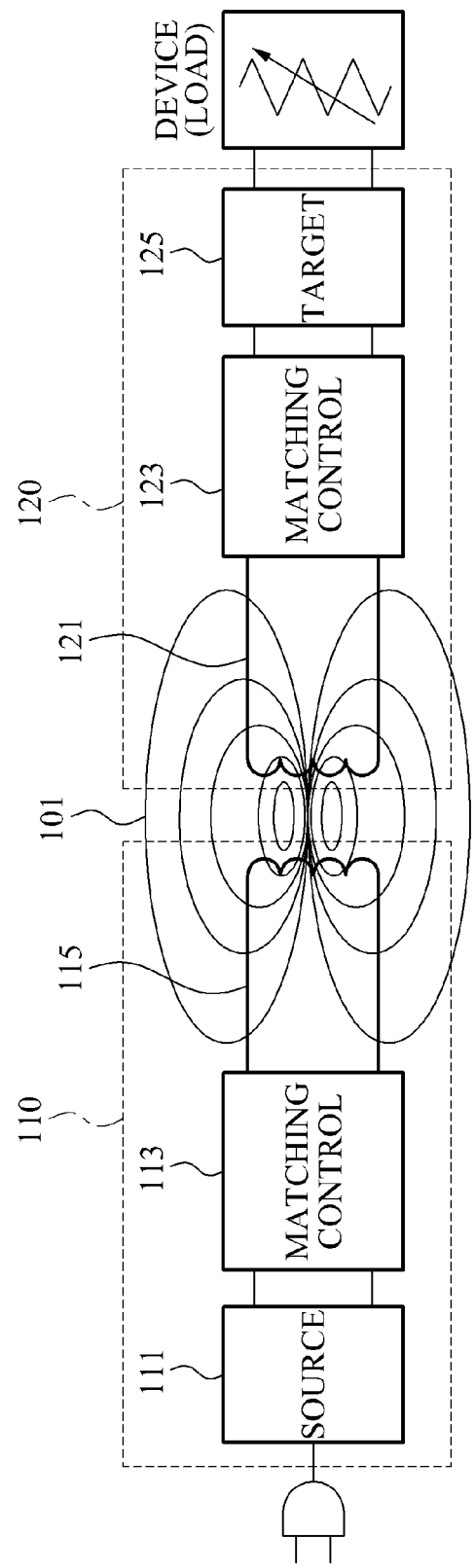
FIG. 1 is a diagram illustrating a wireless power transmission system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates a wireless power transmission system.

In one or more embodiments, a wireless power transmitted using the wireless power transmission system may be resonance power. However, it will be appreciated that in other embodiments various other methodologies for electromagnetic power transmission may be used; including wired and wireless technologies, for instance.

The wireless power transmission system may have a source-target structure including a source and a target. As shown in FIG. 1, the wireless power transmission system may include a resonance power transmitter 110 corresponding to the source and a resonance power receiver 120 corresponding to the target being configured for the wireless transmission of electromagnetic energy.

The resonance power transmitter 110 may include a source unit 111 and a source resonator 115. The source unit 111 may be configured to receive energy from an external voltage supplier to generate resonance power. The resonance power transmitter 110 may further include a matching control 113 to perform resonance frequency or impedance matching for resonance power transmission via an inductive or magnetic coupling 101.

The source unit 111 may include, for example, one or more of: an alternating current (AC)-to-AC (AC/AC) converter, an AC-to-direct current (DC) (AC/DC) converter, and/or a (DC/AC) inverter. The AC/AC converter may adjust, to a desired level, a signal level of an AC signal input from an external device. The AC/DC converter may output a DC voltage at a predetermined level by rectifying an AC signal output from the AC/AC converter. The DC/AC inverter may be configured to generate an AC signal, for example, of a few megahertz (MHz) to tens of MHz band by quickly switching a DC voltage output from the AC/DC converter. AC voltage output having other frequencies is also possible.

The matching control 113 may be configured to set a resonance bandwidth of the source resonator 115, an impedance matching frequency of the source resonator 115 or both. The matching control 113 may include a source resonance bandwidth setting unit and/or a source matching frequency setting unit. The source resonance bandwidth setting unit may set the resonance bandwidth of the source resonator 115, for example. The source matching frequency setting unit may be configured to set the impedance matching frequency of the source resonator 115. In various implementations, a Q-factor of the source resonator 115 may be determined, for instance, based on setting of the resonance bandwidth of the source resonator 115 or setting of the impedance matching frequency of the source resonator 115.

The source resonator 115 may be configured to transfer electromagnetic energy wirelessly to a target resonator 121. For example, in one or more embodiments, the source resonator 115 may be configured to transfer the resonance power to the resonance power receiver 120 through inductive coupling 101. The source resonator 115 may be configured to resonate within the set resonance bandwidth.

As shown in FIG. 1, the source resonator 115 may be configured to convert electrical energy into magnetic energy for wireless transmission of power through the inductive coupling 101 to the target resonator 121. The target resonator 121 in turn receives magnetic energy and converts the received magnetic energy into corresponding electrical energy. The source resonator 115 and the target resonator 121 forming the inductive coupling 101 may be configured, for example, in a helix coil structured resonator, a spiral coil structured resonator, a meta-structured resonator, or the like. As such, the resonator power transmitter 110 and the resonance power receiver may be physically spaced apart to permit power transmission inductively without any wired connections there between.

The resonance power receiver 120 may include the target resonator 121, a matching control 123 configured to perform resonance frequency or impedance matching, and a target unit 125 configured to transfer the received resonance power to a load.

The target resonator 121 may be configured to receive the electromagnetic energy from the source resonator 115. The target resonator 121 may also be configured to resonate within the set resonance bandwidth.

The matching control 123 may be configured to set at least one of a resonance bandwidth of the target resonator 121 and an impedance matching frequency of the target resonator 121. In various implementations, the matching control 123 may include a target resonance bandwidth setting unit and/or a target matching frequency setting unit. The target resonance bandwidth setting unit may set the resonance bandwidth of the target resonator 121 with the target matching frequency setting unit configured to set the impedance matching frequency of the target resonator 121. In some implementations, a Q-factor of the target resonator 121 may be determined based on setting of the resonance bandwidth of the target resonator 121 or setting of the impedance matching frequency of the target resonator 121.

The target unit 125 may be configured to transfer the received resonance power to the device (load). The target unit 125 may include, for example, an AC/DC converter and/or a DC/DC converter. In some implementations, the AC/DC converter may generate a DC voltage by rectifying an AC signal transmitted from the source resonator 115 to the target resonator 121. And the DC/DC converter may supply a rated voltage to a device or the load by adjusting a voltage level of the DC voltage.

Referring to FIG. 1, a process of controlling the Q-factor may include setting the resonance bandwidth of the source resonator 115 and the resonance bandwidth of the target resonator 121, and transferring the electromagnetic energy from the source resonator 115 to the target resonator 121 through inductive coupling 101 between the source resonator 115 and the target resonator 121. The resonance bandwidth of the source resonator 115 may be set, for instance, to be wider or narrower than the resonance bandwidth of the target resonator 121. Accordingly, an unbalanced relationship between a BW-factor of the source resonator 115 and a BW-factor of the target resonator 121 may be maintained by setting the resonance bandwidth of the source resonator 115 to be wider or narrower than the resonance bandwidth of the target resonator 121.

In wireless power transmission employing a resonance scheme, the resonance bandwidth can be an important factor. For example, with the Q-factor (considering, for instance, one or more of: a change in a distance between the source resonator 115 and the target resonator 121, a change in the resonance impedance, impedance mismatching, a reflected signal, and/or the like), denoted as Qt, it has been found that Qt may have an inverse-proportional relationship with the resonance bandwidth, as given by Equation 1.

$$\frac{\Delta f}{f_0} = \frac{1}{Qt}$$ [Equation 1]

$$= \Gamma_{S,D} + \frac{1}{BW_S} + \frac{1}{BW_D}$$

In Equation 1, $f_0$ denotes a central frequency, $\Delta f$ denotes a change in a bandwidth, $\Gamma_{S,D}$ denotes a reflection loss between the source resonator 115 and the target resonator 121, BWs denotes the resonance bandwidth of the source resonator 115, and $BW_D$ denotes the resonance bandwidth of the target resonator 121. The BW-factor may indicate either 1/BWs or $1/BW_D$, for example, Due to one or more external factors including, for example, a change in the distance between the source resonator 115 and the target resonator 121, a change in a location of at least one of the source resonator 115 and the target resonator 121, or the like, impedance mismatching between the source resonator 115 and the target resonator 121 can occur. The impedance mismatching may be a direct cause in decreasing an efficiency of power transfer. Thus, when a reflected wave corresponding to a transmission signal that is partially reflected and returned is detected, the matching control 113 may be configured to determine whether an impedance mismatching has occurred, and may also be configured to perform impedance matching. The matching control 113, for instance, may change a resonance frequency by detecting a resonance point through a waveform analysis of the reflected wave. In one implementation, the matching control 113 may determine, as the resonance frequency to be a frequency having a minimum amplitude in the waveform of the reflected wave.

An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

One or more of the materials of the embodiments disclosed herein may be metamaterials. The magnetic permeability may indicate a ratio between a magnetic flux density occurring with respect to a given magnetic field in a corresponding material and a magnetic flux density occurring with respect to the given magnetic field in a vacuum state. The magnetic permeability and the permittivity, in some embodiments, may be used to determine a propagation constant of a corresponding material in a given frequency or a given wavelength. An electromagnetic characteristic of the corresponding material may be determined based on the magnetic permeability and the permittivity. According to an aspect, the metamaterial may be easily disposed in a resonance state without significant material size changes. This may be practical for a relatively large wavelength area or a relatively low frequency area, for instance.

Figure 2A:
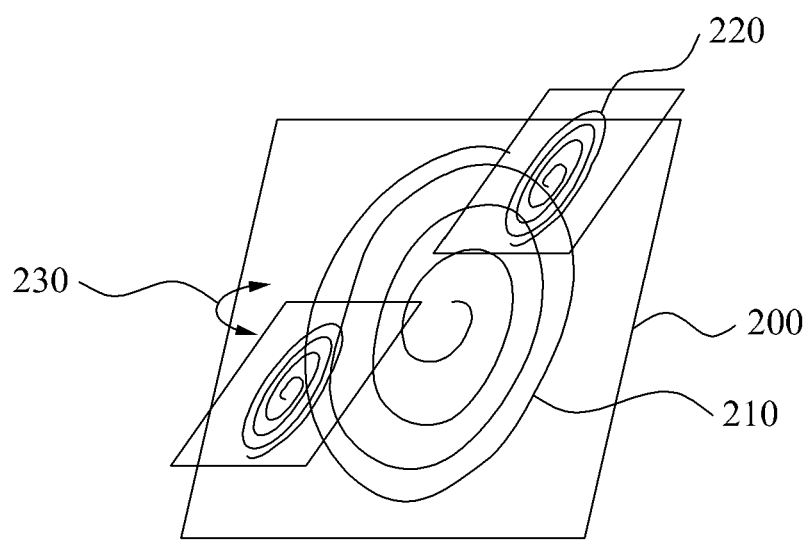
FIGS. 2A through 2C relate to a pad-type charging apparatus using resonance power transmission.

FIG. 2A illustrates a diagram of a pad-type charging apparatus using resonance power transmission including a source resonator 210 and a target resonator 220.

A wireless charger 200 employs a "pad-type" charging scheme where a mobile device is placed on a charging pad to wirelessly charge the mobile device based on a resonance power transmission scheme, in the same manner as the induction charging scheme. Wireless charging based on the resonance power transmission scheme may use a near field magnetic coupling scheme and thus, when the distance between the source resonator 210 and the target resonator 220 is close, for example, less than or equal to 1 cm, an impedance may rapidly vary.

When the distance between the source resonator 210 and the target resonator 220 is less than or equal to several millimeters, an impedance may widely and rapidly vary and thus, an efficiency of a resonator may decrease in an operating frequency. The wide and rapid change in the impedance may affect an input/output matching of a power amplifier that supplies a wireless power and an input/output matching of a rectifier that converts a received AC power to a DC power. Accordingly, an efficiency of a wireless power transmission system may be deteriorated.

The wide and rapid change in the impedance may be minimized by impedance matching, for example, when a location 230 of the resonator 220 is slightly different from a matching location or when a plurality of target resonators are placed on the charging pad for a multi-target device, the impedance of the resonator may vary again. Therefore, when the resonance power transmission scheme is used, a pad-type wireless charger may not be effective to obtain high wireless power transmission efficiency.

Unlike a conventional induction scheme, a resonance power transmission scheme may perform wireless power transmission even when a distance between a source resonator 210 and a target resonator 220 is more than several dozen centimeters, for instance. Thus, even when a location of a center of the source resonator 210 is different from a location of a center of the target resonator 220, the wireless power transmission may be effectively performed.

Figure 2B:
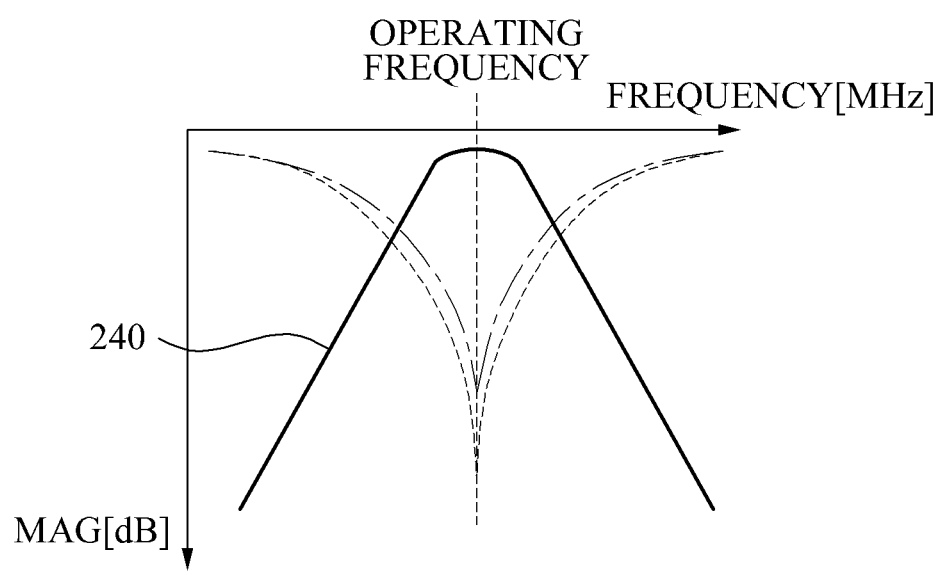
Figure 2C:
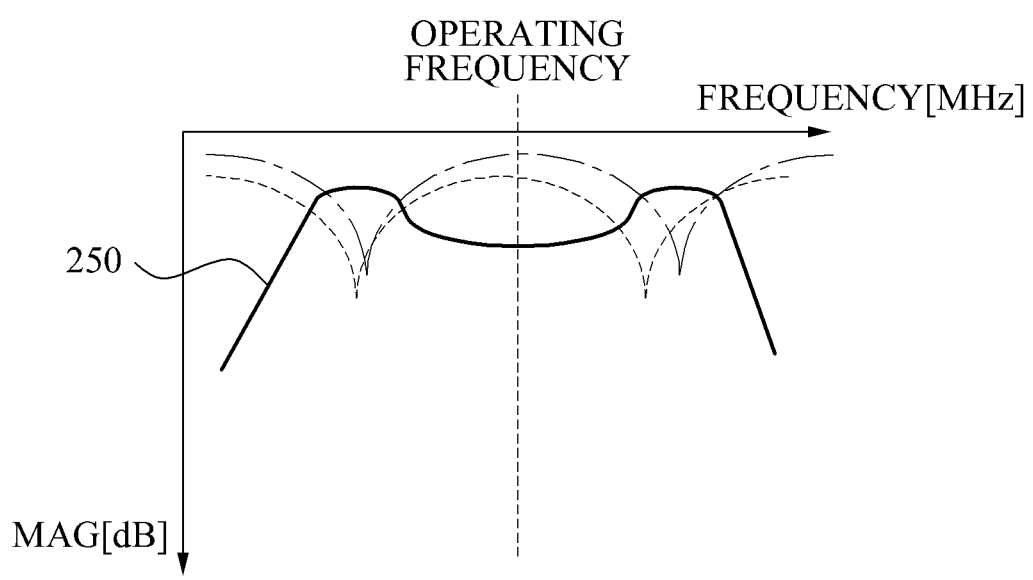

Wireless chargers using resonance power transmission for low-power mobile devices having a power-use level less than or equal to 10 watts (W) have been studied. FIG. 2B illustrates a plot of transmission efficiency as a function of operation frequency when the distance between the source resonator 210 and the target resonator 220 is greater than or equal to a several dozen centimeters. FIG. 2C illustrates a plot of transmission efficiency as a function of operation frequency when the distance between the source resonator 210 and the target resonator 220 is less than or equal to several millimeters.

The plot illustrated in FIG. 2B, shows a transmission efficiency 240 may be highest in an operating frequency where the target resonator 220 and the source resonator 210 perform resonance power transmission. On the other hand, the plot illustrated in FIG. 2C, shows that a transmission efficiency 250 may be lowest when the distance between the target resonator 220 and the source resonator 210 is less than about several millimeters.

Figure 3:
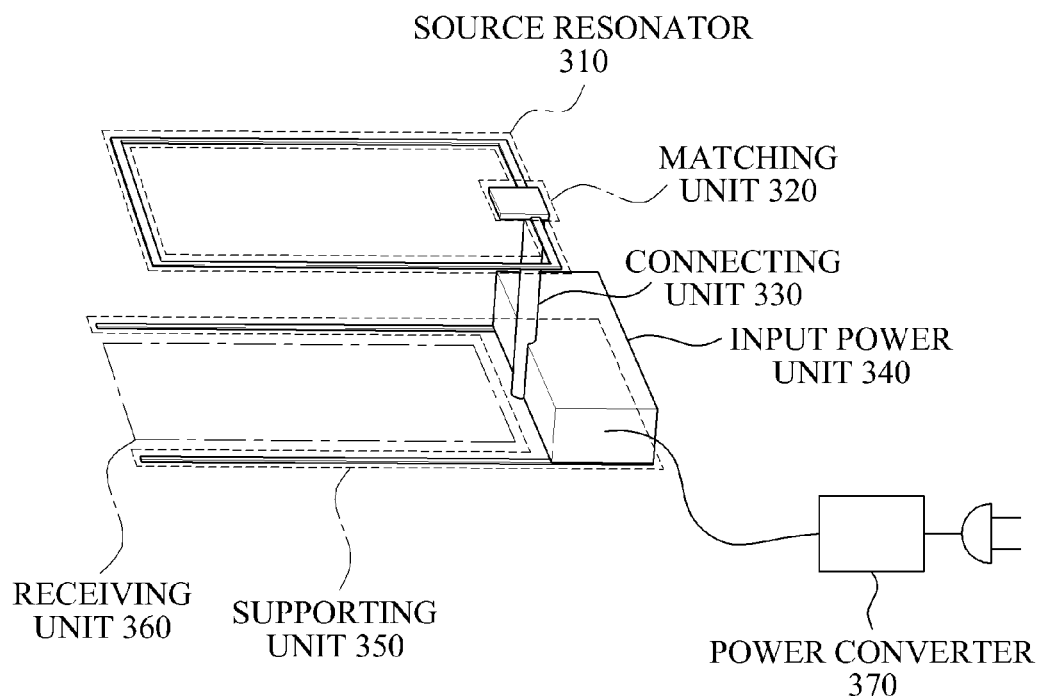
FIG. 3 is a diagram illustrating a roof-type charging apparatus using resonance power transmission.

FIG. 3 illustrates a roof-type charging apparatus using resonance power transmission.

As shown, the roof-type charging apparatus using resonance power transmission may include a source resonance unit 310, a matching unit 320, a connecting unit 330, an input power unit 340, a supporting unit 350, a receiving unit 360, and a power converter 370.

According to an aspect, the charging apparatus may be configured as a "roof-type." The term "roof-type," as used herein, refers to a charging apparatus including one or more resonator sources having a generally planar loop configuration defining a space therein. The resonator source(s) as such may be referred to as a "roof." In some embodiments, the one or more source resonators may be configured as a circular structure, an oval structure, an elliptical structure, a rectangular structure, a square structure, triangular structure, polygonal structure, or the like. An effective charging radius may be defined based on the shape or geometry of the "roof" source resonator. One or more target resonators which are to receive a charge wirelessly, such as, for example, a battery, may be positioned inside the effective charging radius. The target resonators receive power transmission inductively without any wired connections there between.

In the roof-type charging apparatus the source resonators may be spaced apart from the receiving unit. For instance, in some embodiments, the source resonators and the receiving unit may be positioned generally parallel with respect to one another. The distance between the source resonators and the receiving unit may be adjusted to provide impedance matching between the source resonator and a target resonator that receives the resonance power transmission. The connecting unit may be providing between the source resonators and the receiving unit for such purposes.

As shown in FIG. 3, the source resonator 310 may be generally rectangular or square-shaped. In one implementation, the source resonator 310 may have a size of 20 cm in length and 20 cm in width, for example. The source resonator 310 may be connected to the matching unit 320 and the connecting unit 330. A predetermined area of the frame of the source resonator may define a space therein and be connected to the matching unit 320 and/or the connecting unit 330.

The source resonance unit 310 may be configured to transmit a resonance power through magnetic coupling regardless of a location of a resonator included in a resonance power receiver, to the resonance power receiver located in a charging radius of the source resonator. The effective charging radius of the source resonator may be determined based on a shape of the source resonator. Advantageously, the source resonance unit 310 may be configured to transmit the resonance power regardless of whether the source resonator and a target resonator included in the resonance power receiver directly face each other.

In various embodiments, the source resonance unit 310 may include a generally planar source resonator that is square-shaped, rectangular-shaped, circle-shaped, triangle-shaped or polygon-shaped (octagon-shaped shown), for example. Of course, it will be appreciated that other shaped source resonators are also possible.

The source resonance unit 310 may also include an extension controller that controls a charging radius of a terminal by controlling a size of the source resonator. The extension controller may be configured to charge or control the size of the source resonator and thus, may increase efficiency in transmitting a resonance power to the terminal in the charging radius. In addition, the extension controller may control the size of the source resonator, and may control the charging radius and thus, may charge multiple terminals. For example, the extension controller may rotate the source resonance unit 310 using the connecting unit 330 as an axis. When the source resonance unit 310 rotates, the charging radius where the terminal is charged may be extended.

The matching unit 320 may be located in a predetermined area of the frame of the source resonator, and may be configured to match, to a predetermined value, a coupling impedance between the source resonator and at least one target resonator. For example, the matching unit 320 may substantially match the coupling impedance between the source resonator and the at least one target resonator. The coupling impedance may be match to within about 50 ohms, in some implementations. The matching unit 320 may control the connecting unit 330 to control a distance between the source resonator and the at least one target resonator for coupling impedance matching. And the matching unit 320 may be connected to the source resonator, and may be located in and occupy a predetermined area inside or outside the roof of the source resonator. Also the matching unit 320 may be connected to the connecting unit 330. For example, the matching unit 320 may be located in an upper part of the connecting unit 330.

The connecting unit 330 may connect the source resonator to the input power unit 340 to enable the input power unit 340 to be separated by a predetermined length away from the source resonator. As such, the connecting unit 330 may enable the source resonator and the matching unit 320 to be separated by the predetermined distance or length away from a ground. In some implementations, the predetermined length may be several dozen centimeters, for instance. The connecting unit 330 may connect the source resonance unit 310 to the input power unit 340.

The connecting unit 330 may be hollow cylinder, having a wireless frequency cable passes through the inside of the hollow cylinder. For example, the connecting unit 330 may be manufactured or otherwise formed as a plastic column of about 10 cm to 20 cm in length. And a radio frequency (RF) cable may pass through the inside the hollow cylinder to the source resonator from a power amplifier, for example. A distance or height of the connecting unit 330 may be controlled for impedance matching between the source resonator and the at least one target resonator. The connecting unit 330 may be manufactured from an insulative material, for example, plastic, to avoid affecting the resonance frequency.

Input power unit 340 may be configured to generate the resonance power based on the resonance frequency, and may provide the resonance power to the source resonator. For example, the input power unit 340 may include a frequency generator and a power amplifier. The frequency generator may generate an operating frequency so that the source resonator and the at least one target resonator perform resonance power transmission. In various implementations, the operating frequency may be a resonance frequency when an impedance of the source resonator and an impedance of the at least one target resonator are matched.

The power amplifier may be configured to amplify the resonance power in response to a request of the at least one target resonator in the operating frequency. The amplified resonance power may be provided to the source resonator. The input power unit 340 may be connected to the connecting unit 330. For example, the input power unit 340 may include the frequency generator and the power amplifier and thus, a weight of the input power unit 340 may comprise a significant portion of a weight of the roof-type charging apparatus using the resonance power transmission.

The supporting unit 350 may be connected to the input power unit 340 and thus, may support the roof-type charging apparatus using the resonance power transmission. The supporting unit 350 may support the roof-type charging apparatus to prevent the roof-type charging apparatus using the resonance power transmission from falling over. For instance, the supporting unit 350 may be connected to the input power unit 340 and thus, may prevent a center of gravity of the roof-type charging apparatus using the resonance power transmission from being at the front or rear of the roof-type charging apparatus. In one implementation, the supporting unit 350 may be configured as a stand. The supporting unit 350 may be manufactured to be thin to prevent affecting the resonance frequency. The supporting unit 350 may be formed of an insulative material, for example, plastic, to avoid affecting the resonance frequency.

The receiving unit 360 may be located in parallel with the source resonator and may receive the resonance power from the source resonator through magnetic coupling. The resonance power receiver located in the receiving unit 360 may receive the resonance power from the source resonator through the at least one target resonator. In one or more embodiments, the resonance power receiver may be configured to charge a battery by converting the received resonance power to DC power using the rectifier. It should be appreciated that the receiving unit 360 need not be configured the same as the source resonance unit 310.

For example, the power converter 370 may convert AC power of a voltage source to DC power. The power converter 370 may include a switching mode power supply (SMPS). The power converter 370 may convert AC power supplied from an outside to DC power. The power converter 370 may then transmit the DC power to the input power unit 340. The AC power may be 220V in some instances.

In the roof-type charging apparatus using the resonance power transmission, the matching unit 320 may be connected from the predetermined area of the frame of the source resonator to a center area of the source resonator, and the input power unit 340 may be located below the center area of the source resonator 310.

The roof-type charging apparatus using the resonance power transmission may include the matching unit 320 located in the center of the source resonator, the connecting unit 330 located under the matching unit 320, and the input power unit 340 located under the connecting unit 330. For example, the supporting unit 350 may be located in a bottom of the input power unit 340, and may support the roof-type charging apparatus using the resonance power transmission.

Figure 4:
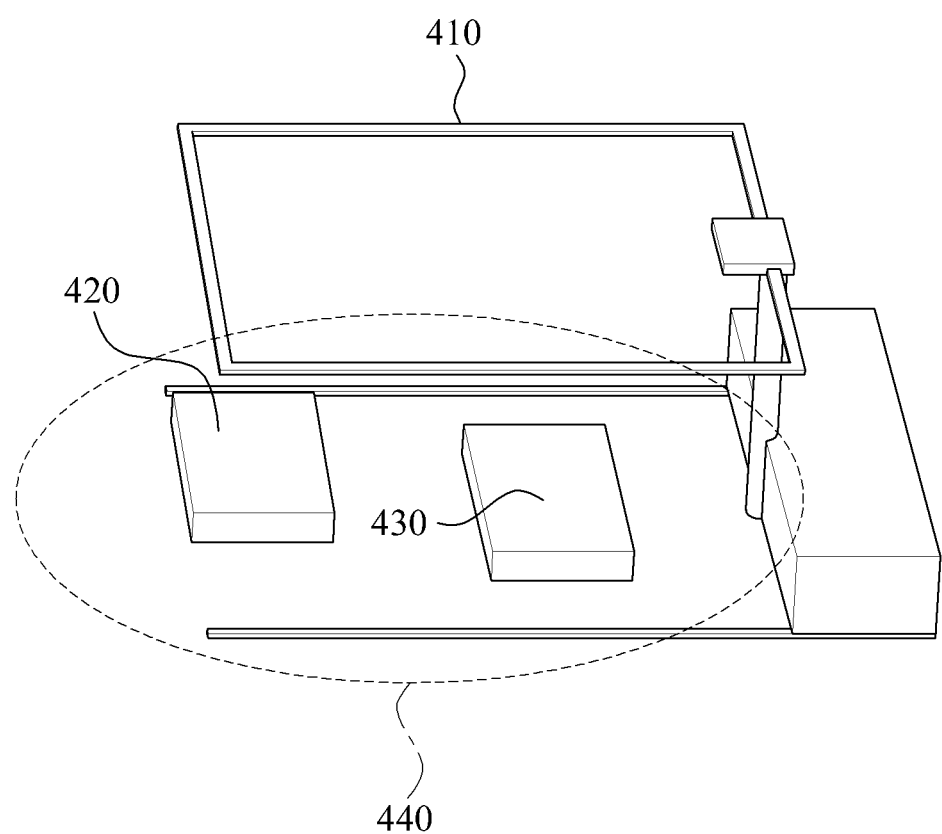
FIG. 4 is a diagram illustrating a location where a target device is charged in a roof-type charging apparatus using resonance power transmission.

FIG. 4 illustrates a location where a target device is charged in a roof-type charging apparatus using resonance power transmission.

Referring to FIG. 4, first and second target devices 420 and 430 may be placed at the bottom of a source resonator 410. The first and second target devices 420 and 430 may receive a resonance power at a constant efficiency, for instance, even when the target devices 420 and 430 may be located in an area 440 under the source resonator 410 that is different an area defined by the source resonator 410.

For example, a charging radius 440 may be determined based on the resonance power transmission efficiency. In various implementations, a charging radius up to an area where the resonance power transmission efficiency is about 70% may be determined as the charging radius. The resonance power transmission efficiency may rapidly decrease when the resonance power transmission is attempted outside the charging radius. The charging radius of the source resonator 410 may be determined based on a shape of the roof of the source resonator 410 and/or an intensity of the resonance power.

Figure 5:
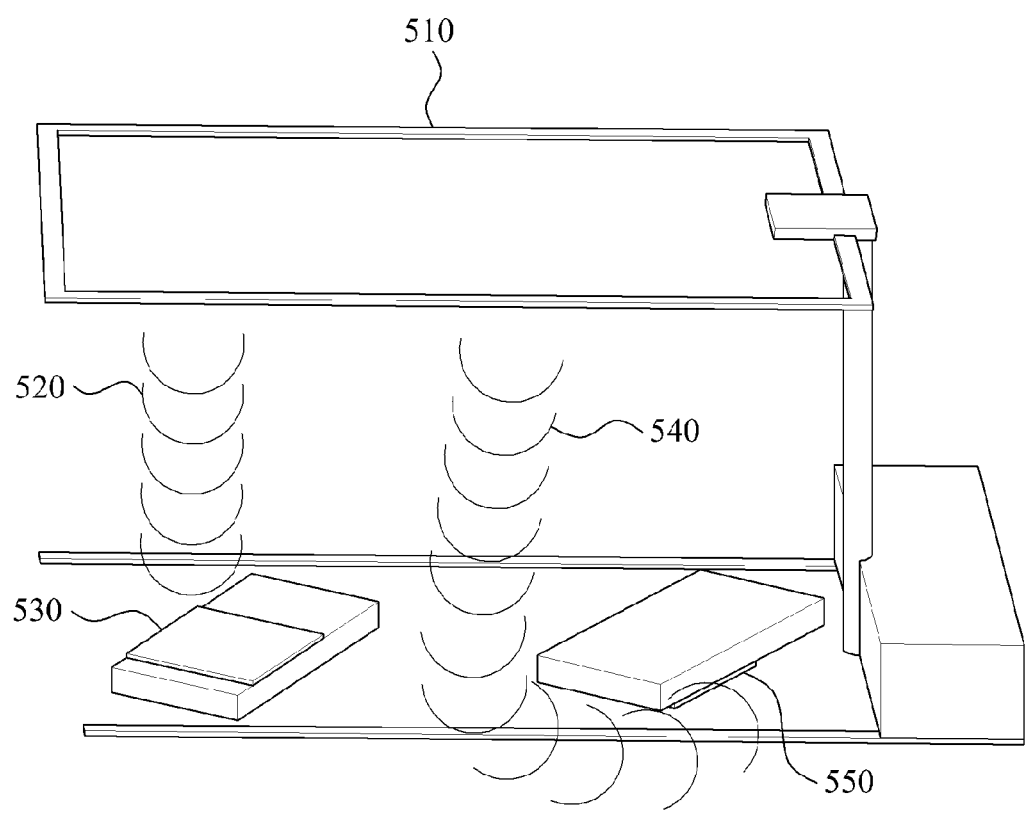
FIG. 5 is a diagram illustrating resonance power transmission based on a location of a target resonator in a resonance power receiver.

FIG. 5 illustrates resonance power transmission based on a location of a target resonator in a resonance power receiver.

Referring to FIG. 5, the resonance power receiver may be placed in a bottom of a source resonator 510. In this example, the resonance power receiver may include target resonators 530 and 550, a film, and a battery. When a resonance power is transmitted from the source resonator 510 to the resonance receiver, an Eddy current may be induced by a conductor used for the resonance power receiver and the battery. Resonance power transmission efficiency unfortunately may decrease due to the induced Eddy current. As such, functions of devices constituting a resonance power transmitter and the resonance power receiver may be damaged by the induced Eddy current.

The film may shield against a magnetic field generated due to the Eddy current, while the battery is charged with power. The film may have a high permeability and may have a low loss characteristic to minimize difficulty generated due to the Eddy current. However, when a shielding material is located between a source resonator and a target resonator, an induction scheme may not be able to perform wireless power transmission.

The resonance power receiver may also include a terminal in some embodiments. The terminal may be configured by covering a top of the battery with a shielding material, such as the film, and place the target resonators 530 and 550 on the shielding material. Although, the induction scheme may not be able to perform wireless power transmission when shielding material exists between the target resonator 550 and the source resonator 510.

Resonance power transmission may be effectively performed through magnetic coupling 520 when the target resonator 530 and the source resonator 510 face each other. However, it should be appreciated that even when the target resonator 550 and the source resonator 510 do not face each other, the resonance power transmission scheme may still effectively perform resonance power transmission, through magnetic coupling 540. For instance, the resonance power may be transmitted in a radial pattern within a charging radius through magnetic coupling.

Figure 6:
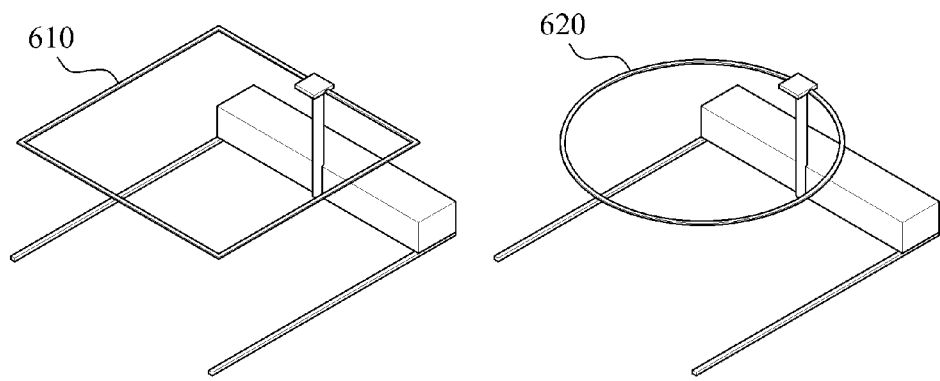
FIG. 6 is a diagram illustrating various examples of source resonators.
Figure 6:
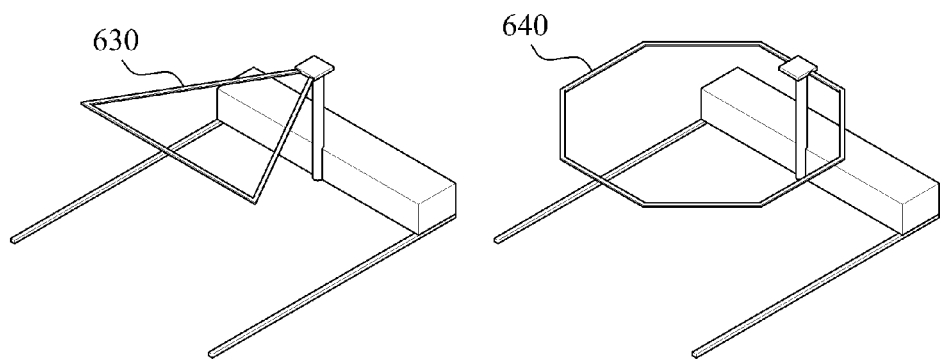

FIG. 6 illustrates various examples of source resonators. Although, it will be appreciated that other source resonator configurations are also possible.

As shown, the roof of the source resonator may be configured, for example, as a square or rectangle 610, a circle 620, a triangle 630, or a polygon 640 (octagon shown). An effective charging radius may be determined based on the shape of the roof of the source resonator.

Figure 7:
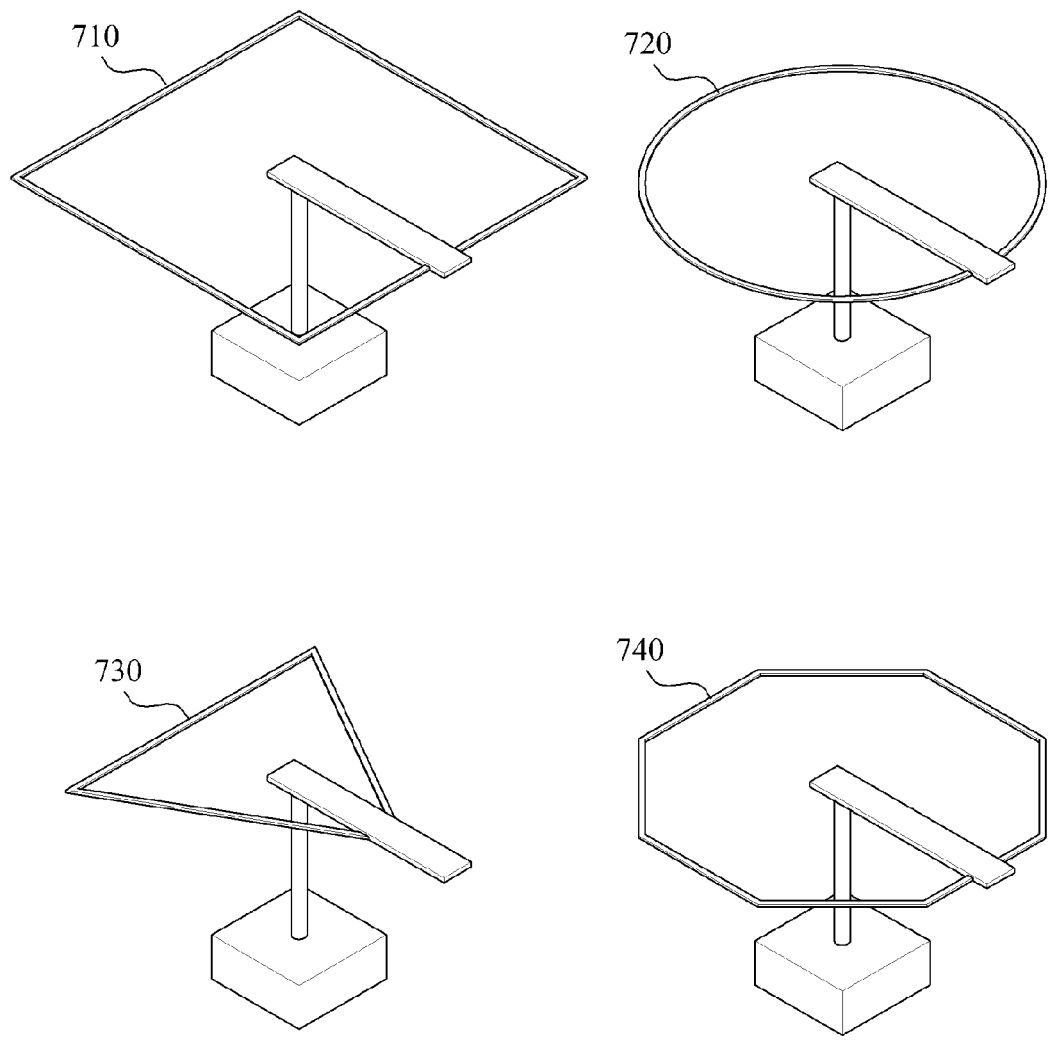
FIG. 7 is a diagram illustrating various examples of roof-type charging apparatuses which use resonance power transmission.

FIG. 7 illustrates a roof-type charging apparatuses using resonance power transmission.

Referring to FIG. 7, the roof-type charging apparatus using resonance power transmission may be configured as a standard lamp. For example, the matching unit 320 may have a predetermined area and may be connected from a frame of the source resonator to the center. For example, the shape of the roof of the source resonator may be configured as a square or rectangle 710, a circle 720, a triangle 730, a polygon 740 (octagon shown), or the like FIG. 8 illustrates a resonator 800 having a two-dimensional (2D) structure.

Figure 8:
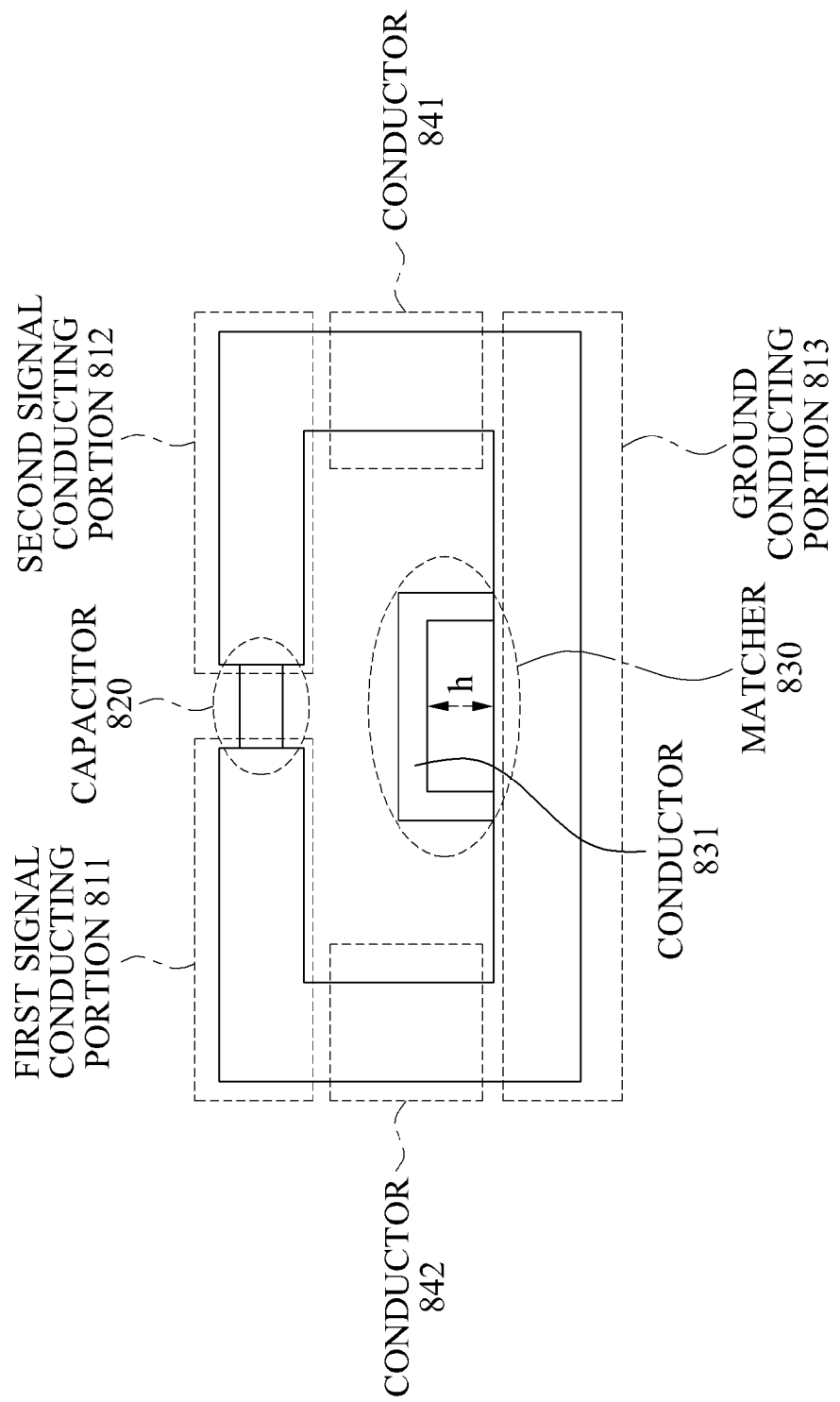
FIG. 8 is a diagram illustrating a resonator having a two-dimensional (2D) structure.

Referring to FIG. 8, the resonator 800 having the 2D structure may include a transmission line, a capacitor 820, a matcher 830, and conductors 841 and 842. The transmission line may include, for instance, a first signal conducting portion 811, a second signal conducting portion 812, and a ground conducting portion 813.

The capacitor 820 may be inserted or otherwise positioned in series between the first signal conducting portion 811 and the second signal conducting portion 812 so that an electric field may be confined within the capacitor 820. In various implementations, the transmission line may include at least one conductor in an upper portion of the transmission line, and may also include at least one conductor in a lower portion of the transmission line. A current may flow through the at least one conductor disposed in the upper portion of the transmission line and the at least one conductor disposed in the lower portion of the transmission may be electrically grounded. As shown in FIG. 8, the resonator 800 may be configured to have a generally 2D structure. The transmission line may include the first signal conducting portion 811 and the second signal conducting portion 812 in the upper portion of the transmission line, and may include the ground conducting portion 813 in the lower portion of the transmission line. As shown, the first signal conducting portion 811 and the second signal conducting portion 812 may be disposed to face the ground conducting portion 813 with current flowing through the first signal conducting portion 811 and the second signal conducting portion 812.

In some implementations, one end of the first signal conducting portion 811 may be electrically connected (i.e., shorted) to a conductor 842, and another end of the first signal conducting portion 811 may be connected to the capacitor 820. And one end of the second signal conducting portion 812 may be grounded to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other, such that the resonator 800 may have an electrically "closed-loop structure." The term "closed-loop structure" as used herein, may include a polygonal structure, for example, a circular structure, a rectangular structure, or the like that is electrically closed.

The capacitor 820 may be inserted into an intermediate portion of the transmission line. For example, the capacitor 820 may be inserted into a space between the first signal conducting portion 811 and the second signal conducting portion 812. The capacitor 820 may be configured, in some instances, as a lumped element, a distributed element, or the like. In one implementation, a distributed capacitor may be configured as a distributed element and include zigzagged conductor lines and a dielectric material having a relatively high permittivity between the zigzagged conductor lines.

When the capacitor 820 is inserted into the transmission line, the resonator 800 may have a property of a metamaterial, as discussed above. For example, the resonator 800 may have a negative magnetic permeability due to the capacitance of the capacitor 820. If so, the resonator 800 may be referred to as a mu negative (MNG) resonator. Various criteria may be applied to determine the capacitance of the capacitor 820. For example, the various criteria for enabling the resonator 800 to have the characteristic of metamaterial may include one or more of the following:, a criterion for enabling the resonator 800 to have a negative magnetic permeability in a target frequency, a criterion for enabling the resonator 800 to have a zeroth order resonance characteristic in the target frequency, or the like.

The resonator 800, also referred to as the MNG resonator 800, may also have a zeroth order resonance characteristic (i.e., having, as a resonance frequency, a frequency when a propagation constant is "0"). If the resonator 800 has a zeroth order resonance characteristic, the resonance frequency may be independent with respect to a physical size of the MNG resonator 800. Moreover, by appropriately designing the capacitor 820, the MNG resonator 800 may sufficiently change the resonance frequency without substantially changing the physical size of the MNG resonator 800 may not be changed.

In a near field, for instance, the electric field may be concentrated on the capacitor 820 inserted into the transmission line. Accordingly, due to the capacitor 820, the magnetic field may become dominant in the near field. In one or more embodiments, the MNG resonator 800 may have a relatively high Q-factor using the capacitor 820 of the lumped element. Thus, it may be possible to enhance power transmission efficiency. For example, the Q-factor indicates a level of an ohmic loss or a ratio of a reactance with respect to a resistance in the wireless power transmission. The efficiency of the wireless power transmission may increase according to an increase in the Q-factor.

The MNG resonator 800 may include a matcher 830 for impedance-matching. For example, the matcher 830 may be configured to appropriately determine and adjust the strength of a magnetic field of the MNG resonator 800, for instance. Depending on the configuration, current may flow in the MNG resonator 800 via a connector, or may flow out from the MNG resonator 800 via the connector. The connector may be connected to the ground conducting portion 813 or the matcher 830. In some instances, power may be transferred through coupling without using a physical connection between the connector and the ground conducting portion 813 or the matcher 830.

As shown in FIG. 8, the matcher 830 may be positioned within the loop formed by the loop structure of the resonator 800. The matcher 830 may adjust the impedance of the resonator 800 by changing the physical shape of the matcher 830. For example, the matcher 830 may include the conductor 831 for the impedance-matching positioned in a location that is separate from the ground conducting portion 813 by a distance h. Accordingly, the impedance of the resonator 800 may be changed by adjusting the distance h.

In some instances, a controller may be provided to control the matcher 830 which generates and transmits a control signal to the matcher 830 directing the matcher to change its physical shape so that the impedance of the resonator may be adjusted. For example, the distance h between a conductor 831 of the matcher 830 and the ground conducting portion 813 may be increased or decreased based on the control signal. The controller may generate the control signal based on various factors.

As shown in FIG. 8, the matcher 830 may be configured as a passive element such as, for example, the conductor 831. Of course, in other embodiments, the matcher 830 may be configured as an active element such as, for example, a diode, a transistor, or the like. If the active element is included in the matcher 830, the active element may be driven based on the control signal generated by the controller, and the impedance of the resonator 800 may be adjusted based on the control signal. For example, when the active element is a diode is included in the matcher 830, the impedance of the resonator 800 may be adjusted depending on whether the diode is in an ON state or in an OFF state.

In some instances, a magnetic core may be further provided to pass through the MNG resonator 800. The magnetic core may perform a function of increasing a power transmission distance.

Figure 9:
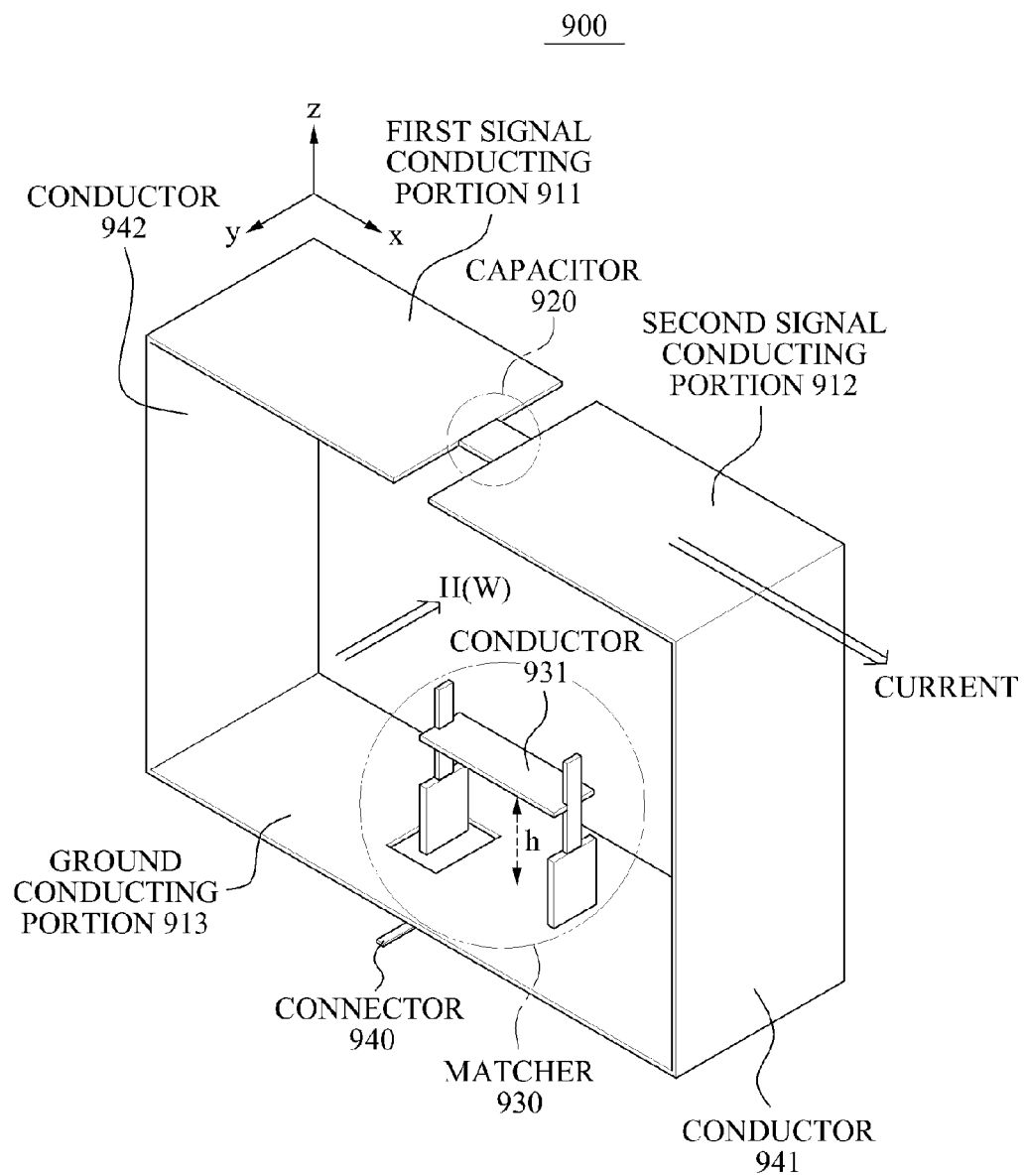
FIG. 9 is a diagram illustrating a resonator having a three-dimensional (3D) structure.

FIG. 9 illustrates a resonator 900 having a three-dimensional (3D) structure.

Referring to FIG. 9, the resonator 900 having the 3D structure may include a transmission line and a capacitor 920. The transmission line may include a first signal conducting portion 911, a second signal conducting portion 912, and a ground conducting portion 913. The capacitor 920 may be inserted, for instance, in series between the first signal conducting portion 911 and the second signal conducting portion 912 of the transmission link, such that an electric field may be confined within the capacitor 920.

As shown in FIG. 9, the resonator 900 may have a generally 3D structure. The transmission line may include the first signal conducting portion 911 and the second signal conducting portion 912 in an upper portion of the resonator 900, and may include the ground conducting portion 913 in a lower portion of the resonator 900. The first signal conducting portion 911 and the second signal conducting portion 912 may be disposed to face the ground conducting portion 913. In this arrangement, current may flow in an x direction through the first signal conducting portion 911 and the second signal conducting portion 912. Due to the current, a magnetic field H(W) may be formed in a −y direction. However, it will be appreciated that the magnetic field H(W) might also be formed in the opposite direction (e.g., the +y direction) in other implementations.

In one or more embodiments, one end of the first signal conducting portion 911 may be electrically connected (i.e., shorted) to a conductor 942, and another end of the first signal conducting portion 911 may be connected to the capacitor 920. One end of the second signal conducting portion 912 may be grounded to the conductor 941, and another end of the second signal conducting portion 912 may be connected to the capacitor 920. Accordingly, the first signal conducting portion 911, the second signal conducting portion 912, the ground conducting portion 913, and the conductors 941 and 942 may be connected to each other, whereby the resonator 900 may have an electrically "closed-loop structure."

As shown in FIG. 9, the capacitor 920 may be inserted or otherwise positioned between the first signal conducting portion 911 and the second signal conducting portion 912. For example, the capacitor 920 may be inserted into a space between the first signal conducting portion 911 and the second signal conducting portion 912. The capacitor 920 may include, for example, a lumped element, a distributed element, or the like. In one implementation, a distributed capacitor having the shape of the distributed element may include zigzagged conductor lines and a dielectric material having a relatively high permittivity positioned between the zigzagged conductor lines.

When the capacitor 920 is inserted into the transmission line, the resonator 900 may have a property of a metamaterial, in some instances, as discussed above.

For example, when a capacitance of the capacitor inserted is a lumped element, the resonator 900 may have the characteristic of the metamaterial. When the resonator 900 has a negative magnetic permeability by appropriately adjusting the capacitance of the capacitor 920, the resonator 900 may also be referred to as an MNG resonator. Various criteria may be applied to determine the capacitance of the capacitor 920. For example, the various criteria may include, for instance, one or more of the following: a criterion for enabling the resonator 900 to have the characteristic of the metamaterial, a criterion for enabling the resonator 900 to have a negative magnetic permeability in a target frequency, a criterion enabling the resonator 900 to have a zeroth order resonance characteristic in the target frequency, or the like. Based on at least one criterion among the aforementioned criteria, the capacitance of the capacitor 920 may be determined.

The resonator 900, also referred to as the MNG resonator 900, may have a zeroth order resonance characteristic (i.e., having, as a resonance frequency, a frequency when a propagation constant is "0"). If the resonator 900 has the zeroth order resonance characteristic, the resonance frequency may be independent with respect to a physical size of the MNG resonator 900. Thus, by appropriately designing the capacitor 920, the MNG resonator 900 may sufficiently change the resonance frequency without substantially changing the physical size of the MNG resonator 900.

Referring to the MNG resonator 900 of FIG. 9, in a near field, the electric field may be concentrated on the capacitor 920 inserted into the transmission line. Accordingly, due to the capacitor 920, the magnetic field may become dominant in the near field. And, since the MNG resonator 900 having the zeroth-order resonance characteristic may have characteristics similar to a magnetic dipole, the magnetic field may become dominant in the near field. A relatively small amount of the electric field formed due to the insertion of the capacitor 920 may be concentrated on the capacitor 920 and thus, the magnetic field may become further dominant.

Also, the MNG resonator 900 may include a matcher 930 for impedance-matching. The matcher 930 may be configured to appropriately adjust the strength of magnetic field of the MNG resonator 900. The impedance of the MNG resonator 900 may be determined by the matcher 930. In one or more implementations, a current may flow in the MNG resonator 900 via a connector 940, or may flow out from the MNG resonator 900 via the connector 940. And the connector 940 may be connected to the ground conducting portion 913 or the matcher 930.

As shown in FIG. 9, the matcher 930 may be positioned within the loop formed by the loop structure of the resonator 900. The matcher 930 may be configured to adjust the impedance of the resonator 900 by changing the physical shape of the matcher 930. For example, the matcher 930 may include the conductor 931 for the impedance-matching in a location separate from the ground conducting portion 913 by a distance h. The impedance of the resonator 900 may be changed by adjusting the distance h.

In some implementations, a controller may be provided to control the matcher 930. In this case, the matcher 930 may change the physical shape of the matcher 930 based on a control signal generated by the controller. For example, the distance h between the conductor 931 of the matcher 930 and the ground conducting portion 913 may be increased or decreased based on the control signal. Accordingly, the physical shape of the matcher 930 may be changed such that the impedance of the resonator 900 may be adjusted. The distance h between the conductor 931 of the matcher 930 and the ground conducting portion 913 may be adjusted using a variety of schemes. For example, a plurality of conductors may be included in the matcher 930 and the distance h may be adjusted by adaptively activating one of the conductors. Alternatively or additionally, the distance h may be adjusted by adjusting the physical location of the conductor 931 up and down. For instance, the distance h may be controlled based on the control signal of the controller. The controller may generate the control signal using various factors. As shown in FIG. 9, the matcher 930 may be configured as a passive element such as, for instance, the conductor 931. Of course, in other embodiments, the matcher 930 may be configured as an active element such as, for example, a diode, a transistor, or the like. When the active element is included in the matcher 930, the active element may be driven based on the control signal generated by the controller, and the impedance of the resonator 900 may be adjusted based on the control signal. For example, if the active element is a diode included in the matcher 930, the impedance of the resonator 900 may be adjusted depending on whether the diode is in an ON state or in an OFF state.

In some implementations, a magnetic core may be further provided to pass through the resonator 900 configured as the MNG resonator. The magnetic core may perform a function of increasing a power transmission distance.

Figure 10:
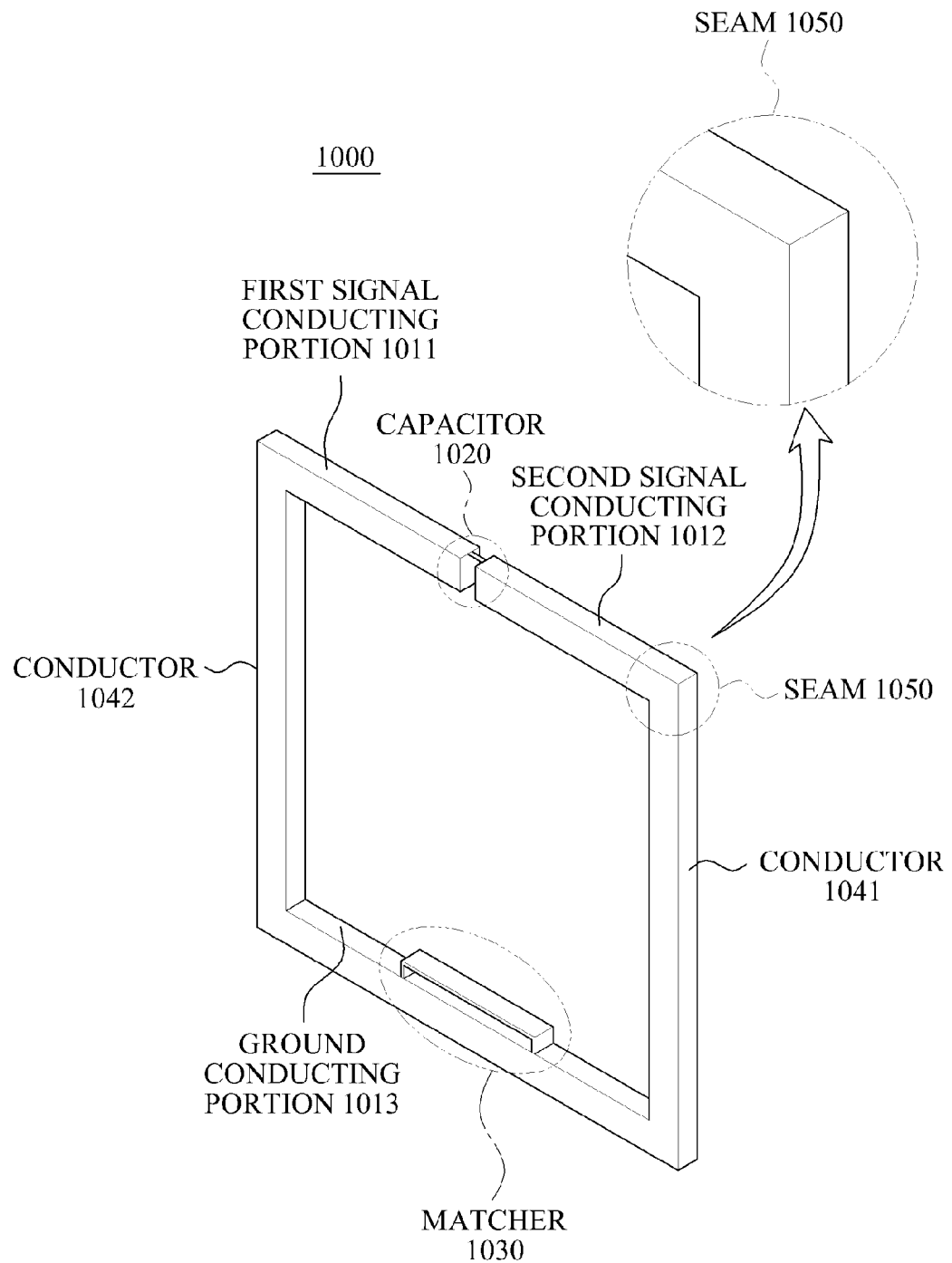
FIG. 10 is a diagram illustrating a resonator for wireless power transmission configured as a bulky type.

FIG. 10 illustrates a resonator 1000 for a wireless power transmission configured as a bulky type.

As used herein, the term "bulky type" may refer to a seamless connection connecting at least two parts in an integrated form.

Referring to FIG. 10, a first signal conducting portion 1011 and a second signal conducting portion 1012 may be integrally formed instead of being separately manufactured and thereby be connected to each other. Similarly, the second signal conducting portion 1012 and a conductor 1041 may also be integrally manufactured.

When the second signal conducting portion 1012 and the conductor 1041 are separately manufactured and then are connected to each other, a loss of conduction may occur due to a seam 1050. Thus, in some implementations, the second signal conducting portion 1012 and the conductor 1041 may be connected to each other without using a separate seam (i.e., seamlessly connected to each other). Accordingly, it is possible to decrease a conductor loss caused by the seam 1050. For instance, the second signal conducting portion 1012 and a ground conducting portion 1013 may be seamlessly and integrally manufactured. Similarly, the first signal conducting portion 1011, the conductor 1142 and the ground conducting portion 1013 may be seamlessly and integrally manufactured. A matcher 1030 may be provided that is similarly constructed as described herein in one or more embodiments.

Figure 11:
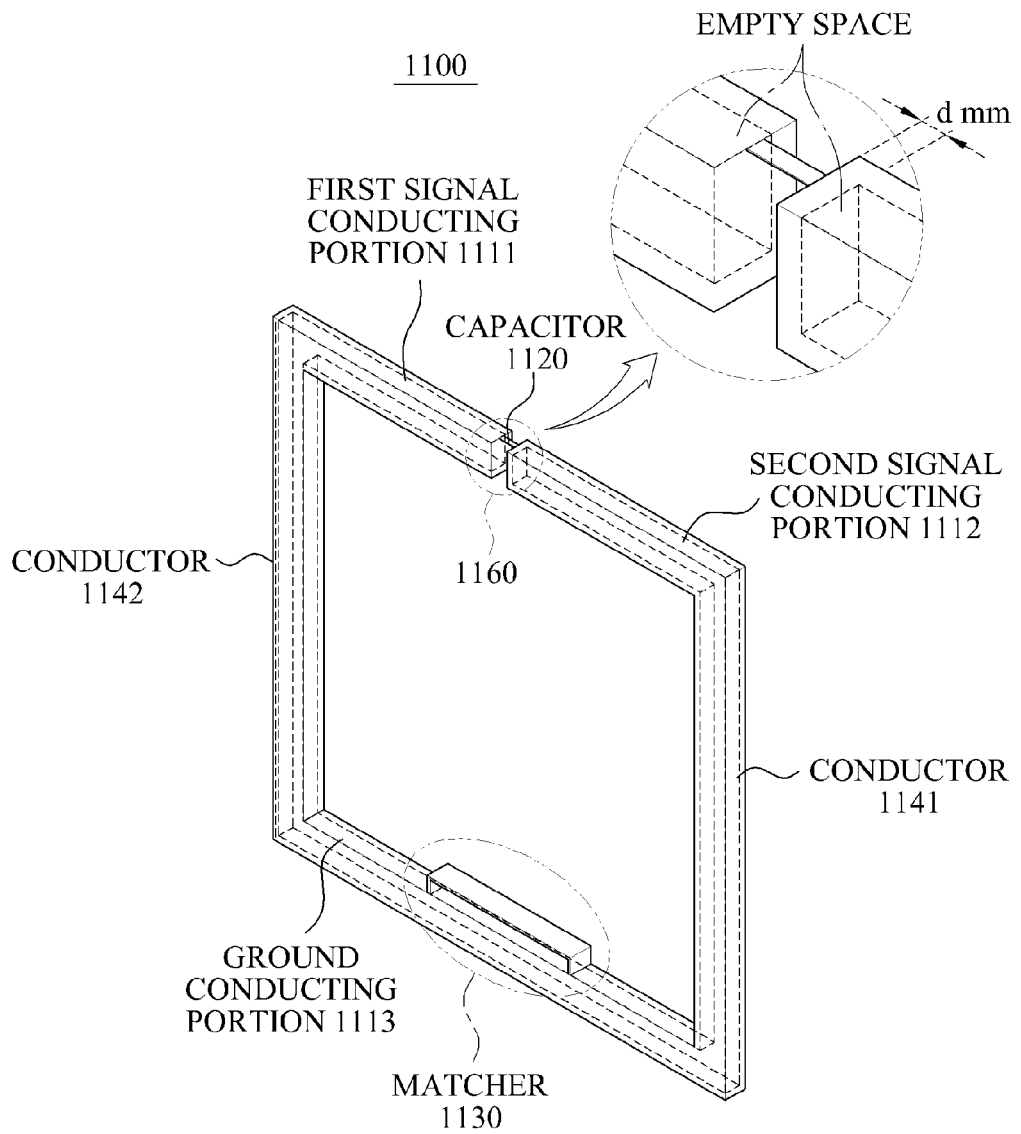
FIG. 11 is a diagram illustrating a resonator for wireless power transmission configured as a hollow type.

FIG. 11 illustrates a resonator 1100 for a wireless power transmission, configured as a hollow type.

Referring to FIG. 11, each of a first signal conducting portion 1111, a second signal conducting portion 1112, a ground conducting portion 1113, and conductors 1141 and 1142 of the resonator 1100 configured as the hollow type structure. As used herein, the term "hollow type" refers to a configuration that may include an empty space inside.

For a given resonance frequency, an active current may be modeled to flow in only a portion of the first signal conducting portion 1111 instead of all of the first signal conducting portion 1111, the second signal conducting portion 1112 instead of all of the second signal conducting portion 1112, the ground conducting portion 1113 instead of all of the ground conducting portion 1113, and the conductors 1141 and 1142 instead of all of the conductors 1141 and 1142. When a depth of each of the first signal conducting portion 1111, the second signal conducting portion 1112, the ground conducting portion 1113, and the conductors 1141 and 1142 is significantly deeper than a corresponding skin depth in the given resonance frequency, it may be ineffective. The significantly deeper depth may, however, increase a weight or manufacturing costs of the resonator 1100 in some instances.

Accordingly, for the given resonance frequency, the depth of each of the first signal conducting portion 1111, the second signal conducting portion 1112, the ground conducting portion 1113, and the conductors 1141 and 1142 may be appropriately determined based on the corresponding skin depth of each of the first signal conducting portion 1111, the second signal conducting portion 1112, the ground conducting portion 1113, and the conductors 1141 and 1142. When each of the first signal conducting portion 1111, the second signal conducting portion 1112, the ground conducting portion 1113, and the conductors 1141 and 1142 has an appropriate depth deeper than a corresponding skin depth, the resonator 1100 may become light, and manufacturing costs of the resonator 1100 may also decrease.

For example, as shown in FIG. 11, the depth of the second signal conducting portion 1112 (as further illustrated in the enlarged view region 1160 indicated by a circle) may be determined as "d" mm and d may be determined according to $$d = \frac{1}{\sqrt{\pi f \mu \sigma}}.$$

Here, f denotes a frequency, μ denotes a magnetic permeability, and σ denotes a conductor constant. In one implementation, when the first signal conducting portion 1111, the second signal conducting portion 1112, the ground conducting portion 1113, and the conductors 1141 and 1142 are made of a copper and they may have a conductivity of $5.8 \times 10^7$ siemens per meter $(S \cdot m^{-1})$, the skin depth may be about 0.6 mm with respect to 10 kHz of the resonance frequency and the skin depth may be about 0.006 mm with respect to 100 MHz of the resonance frequency.

A capacitor 1120 and a matcher 1130 may be provided that are similarly constructed as described herein in one or more embodiments.

Figure 12:
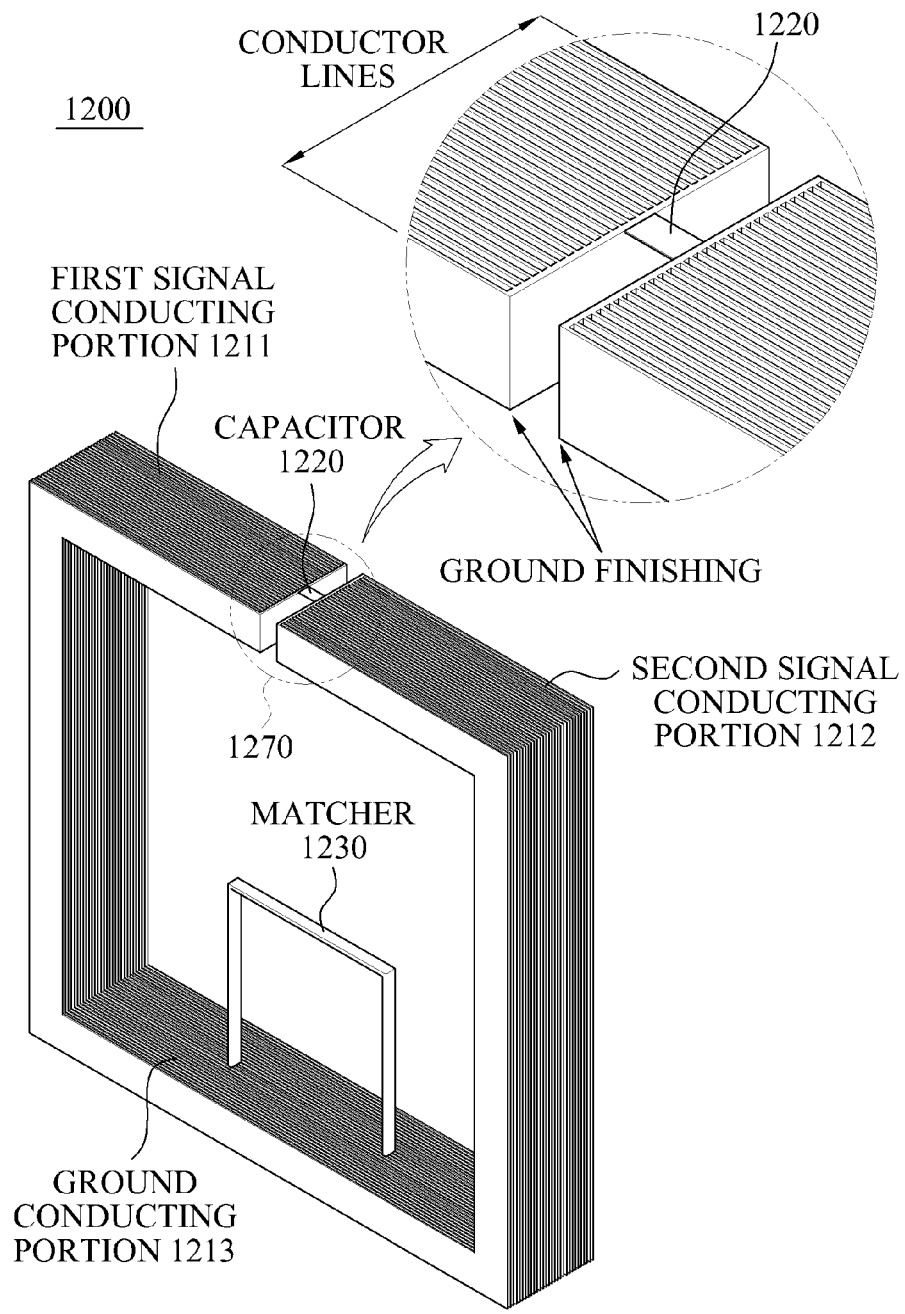
FIG. 12 is a diagram illustrating a resonator for wireless power transmission using a parallel-sheet.

FIG. 12 illustrates a resonator 1200 for a wireless power transmission using a parallel-sheet.

Referring to FIG. 12, the parallel-sheet may be applicable to each of a first signal conducting portion 1211 and a second signal conducting portion 1212 included in the resonator 1200.

Each of the first signal conducting portion 1211 and the second signal conducting portion 1212 may not be a perfect conductor and thus, may have an inherent resistance. Due to this resistance, an ohmic loss may occur. The ohmic loss may decrease a Q-factor and also decrease a coupling effect.

By applying the parallel-sheet to each of the first signal conducting portion 1211 and the second signal conducting portion 1212, it may be possible to decrease the ohmic loss, and to increase the Q-factor and the coupling effect. Referring to the enlarges view portion 1270 indicated by a circle, when the parallel-sheet is applied, each of the first signal conducting portion 1211 and the second signal conducting portion 1212 may include a plurality of conductor lines. The plurality of conductor lines may be disposed in parallel, and may be electrically connected (i.e., shorted) at an end portion of each of the first signal conducting portion 1211 and the second signal conducting portion 1212.

When the parallel-sheet is applied to each of the first signal conducting portion 1211 and the second signal conducting portion 1212, the plurality of conductor lines may be disposed in parallel. Accordingly, a sum of resistances having the conductor lines may decrease. Consequently, the resistance loss may decrease, and the Q-factor and the coupling effect may increase.

A capacitor 1220 and a matcher 1230 positioned on the ground conducting portion 1213 may be provided that are similarly constructed as described herein in one or more embodiments.

Figure 13:
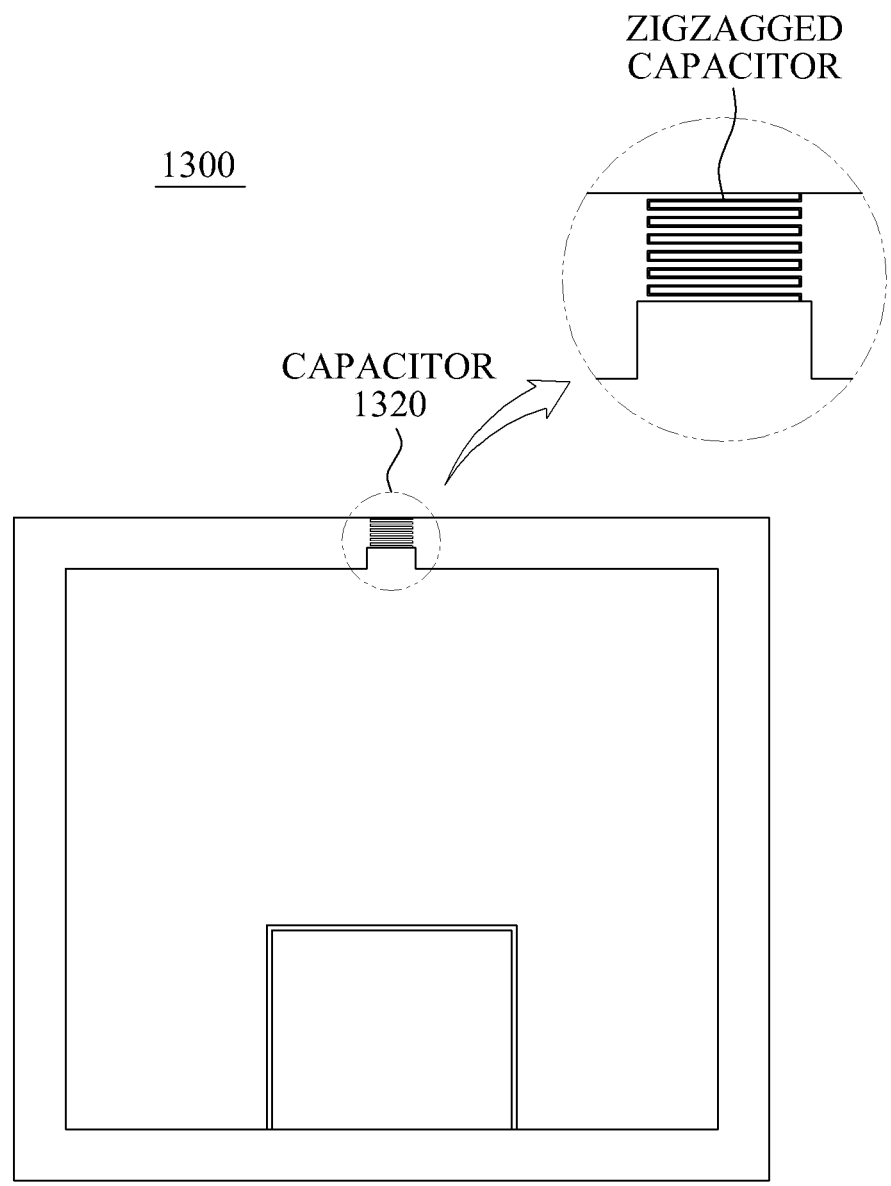
FIG. 13 is a diagram illustrating a resonator for wireless power transmission, the resonator including a distributed capacitor.

FIG. 13 illustrates a resonator 1300 for a wireless power transmission, including a distributed capacitor.

Referring to FIG. 13, a capacitor 1320 included in the resonator 1300 is configured for the wireless power transmission. A capacitor used as a lumped element may have a relatively high equivalent series resistance (ESR). A variety of schemes have been proposed to decrease the ESR contained in the capacitor of the lumped element. According to an embodiment, by using the capacitor 1320 as a distributed element, it may be possible to decrease the ESR. As will be appreciated, a loss caused by the ESR may decrease a Q-factor and a coupling effect.

As shown in FIG. 13, the capacitor 1320 may be configured as a conductive line having a zigzagged structure.

By employing the capacitor 1320 as the distributed element, it may be possible to decrease the loss occurring due to the ESR in some instances. In addition, by disposing a plurality of capacitors as lumped elements, it is possible to decrease the loss occurring due to the ESR. Since a resistance of each of the capacitors as the lumped elements decreases through a parallel connection, active resistances of parallel-connected capacitors as the lumped elements may also decrease whereby the loss occurring due to the ESR may decrease. For example, by employing ten capacitors of 1 pF each instead of using a single capacitor of 10 pF, it may be possible to decrease the loss occurring due to the ESR in some instances.

Figure 14A:
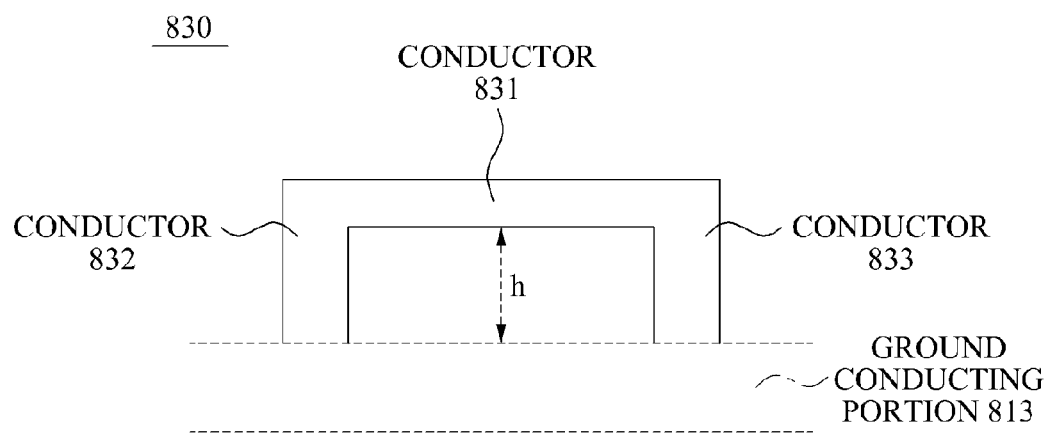
FIG. 14A is a diagram illustrating a matcher used by a 2D resonator.
Figure 14B:
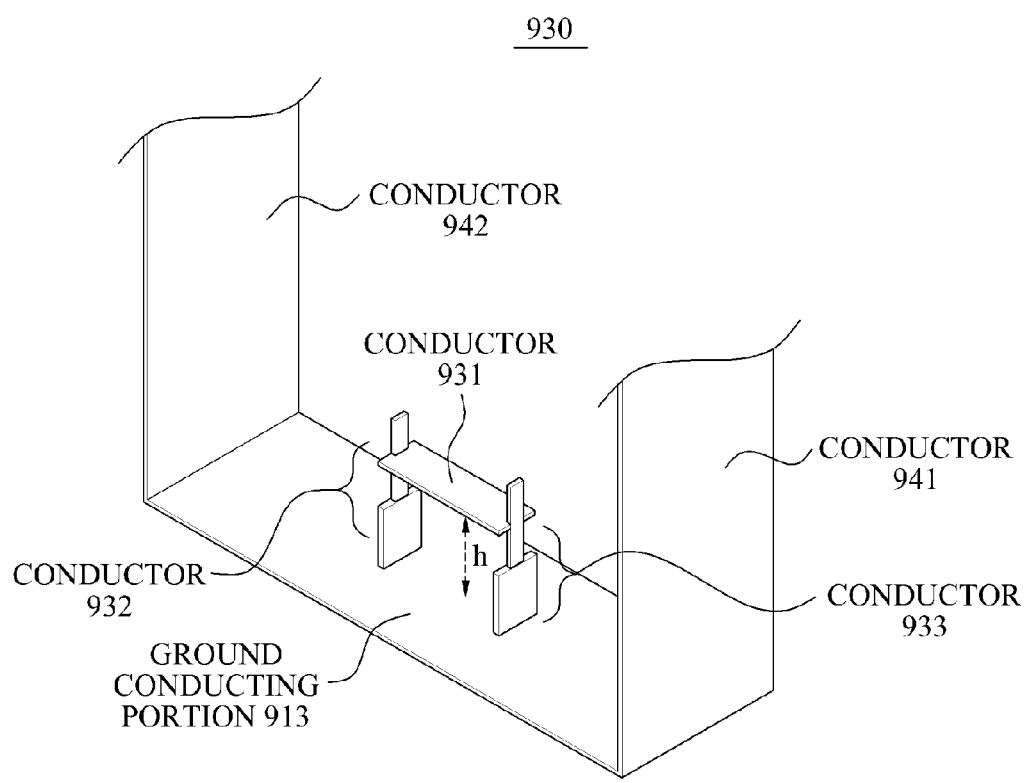
FIG. 14B is a diagram illustrating a matcher used by a 3D resonator.

FIG. 14A illustrates the matcher 830 used in the resonator 800 provided in the 2D structure of FIG. 8, and FIG. 14B illustrates an example of the matcher 930 used in the resonator 900 provided in the 3D structure of FIG. 9.

FIG. 14A illustrates a portion of the 2D resonator including the matcher 830, and FIG. 14B illustrates a portion of the 3D resonator of FIG. 9 including the matcher 930.

Referring to FIG. 14A, the matcher 830 may include the conductor 831, a conductor 832, and a conductor 833. The conductors 832 and 833 may be connected to the ground conducting portion 813 and the conductor 831. The impedance of the 2D resonator may be determined based on a distance h between the conductor 831 and the ground conducting portion 813. The distance h between the conductor 831 and the ground conducting portion 813 may be controlled by the controller. The distance h between the conductor 831 and the ground conducting portion 813 can be adjusted using a variety of schemes. For example, the variety of schemes may include, for instance, one or more of the following: a scheme of adjusting the distance h by adaptively activating one of the conductors 831, 832, and 833, a scheme of adjusting the physical location of the conductor 831 up and down, or the like.

Referring to FIG. 14B, the matcher 930 may include the conductor 931, a conductor 932, a conductor 933 and conductors 941 and 942. The conductors 932 and 933 may be connected to the ground conducting portion 913 and the conductor 931. Also, the conductors 941 and 942 may be connected to the ground conducting portion 913. The impedance of the 3D resonator may be determined based on a distance h between the conductor 931 and the ground conducting portion 913. The distance h between the conductor 931 and the ground conducting portion 913 may be controlled by the controller, for example. Similar to the matcher 830 included in the 2D structured resonator, in the matcher 930 included in the 3D structured resonator, the distance h between the conductor 931 and the ground conducting portion 913 may be adjusted using a variety of schemes. For example, the variety of schemes may include, for instance, one or more of the following: a scheme of adjusting the distance h by adaptively activating one of the conductors 931, 932, and 933, a scheme of adjusting the physical location of the conductor 931 up and down, or the like.

In some implementations, the matcher may include an active element. Thus, a scheme of adjusting an impedance of a resonator using the active element may be similar as described above. For example, the impedance of the resonator may be adjusted by changing a path of a current flowing through the matcher using the active element.

Figure 15:
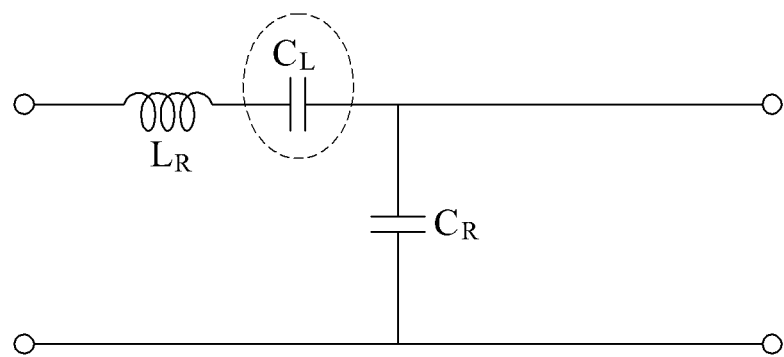
FIG. 15 is a diagram illustrating one equivalent circuit of the resonator for wireless power transmission illustrated in FIG. 8.

FIG. 15 illustrates one example of an equivalent circuit of the resonator 800 for the wireless power transmission of FIG. 8.

The resonator 800 of FIG. 8 for the wireless power transmission may be modeled to the equivalent circuit of FIG. 15. In the equivalent circuit depicted in FIG. 15, $L_R$ denotes an inductance of the power transmission line, $C_L$ denotes the capacitor 820 that is inserted in a form of a lumped element in the middle of the power transmission line, and $C_R$ denotes a capacitance between the power transmissions and/or ground of FIG. 8.

In some instances, the resonator 800 may have a zeroth resonance characteristic. For example, when a propagation constant is "0", the resonator 800 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}} \quad \text{[Equation 2]}$$

In Equation 2, MZR denotes a Mu zero resonator. Referring to Equation 2, the resonance frequency $\omega_{MZR}$ of the resonator 800 may be determined by $L_R/C_L$. A physical size of the resonator 800 and the resonance frequency $\omega_{MZR}$ may be independent with respect to each other. Since the physical sizes are independent with respect to each other, the physical size of the resonator 800 may be sufficiently reduced.

Example embodiments may provide a roof-type charging apparatus using resonance power transmission, and the roof-type charging apparatus may enable a source resonator and a target device to be separated by a predetermined distance away from each other and thus, may stabilize a coupling impedance of two resonators to be a predetermined impedance.

Example embodiments may provide a roof-type charging apparatus using resonance power transmission, and the roof-type charging apparatus may stabilize a coupling impedance to be a predetermined impedance and thus, a power amplifier and a rectifier may be easily matched.

Example embodiments may provide a roof-type charging apparatus using resonance power transmission, and the roof-type charging apparatus may stabilize a coupling impedance to be a predetermined impedance and thus, a change in the impedance may be low and multiple target devices may be charged.

Example embodiments may adjust a size of a source resonator and thus, a charging radius where a target device is charged may be controlled and multiple target devices may be charged.

In various embodiments, one or more of the processes, functions, methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

It is understood that the terminology used herein, may be different in other applications or when described by another person of ordinary skill in the art.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A roof-type charging apparatus using resonance power transmission, the apparatus comprising:
   a source resonance unit included in a roof of the charging apparatus, the source resonance unit configured to transmit resonance power via a source resonator having a generally planar loop configuration and defining a space therein;
   a receiving unit on which a target resonator is to be positioned to receive the resonance power transmitted from the source resonator;
   a connecting unit configured to separate the source resonator and the receiving unit by a predetermined distance; and
   a matching unit configured to match a coupling impedance of the source resonator and the target resonator that receives the resonance power transmission,
   wherein the matching unit further controls the connecting unit to control a vertical distance between the roof of the apparatus and the receiving unit for coupling impedance matching between the source resonator and the target resonator.

2. The apparatus of claim 1, wherein the source resonator and the receiving unit are positioned generally parallel with respect to one another.

3. The apparatus of claim 1, wherein the source resonator is one of:
   square-shaped, rectangular-shaped, circle-shaped, oval-shaped, elliptical-shaped, triangle-shaped, octagon-shaped and polygon-shaped.

4. The apparatus of claim 1, wherein the source resonator defines an effective charging radius of the source resonator as a minimal distance at which power transfer occurs.

5. The apparatus of claim 4, wherein a target resonator that receives the resonance power transmission is positioned inside the effective charging radius of the source resonator.

6. The apparatus of claim 1, further comprising:
   an input power unit configured to generate a resonance power based on a resonance frequency, and to provide the resonance power to the source resonator.

7. The apparatus of claim 6, wherein the input power unit is located below the space defined by the source resonator.

8. The apparatus of claim 1, wherein, during resonance power transmission, the connecting unit controls the vertical distance between the roof of the apparatus and the receiving unit such that the source resonator is at least a ten centimeters (cm) above the target resonator during resonation.

9. The apparatus of claim 1, wherein the matching unit is positioned in the space defined by the source resonator.

10. The apparatus of claim 1, wherein the source resonance unit includes a frame configured to connect the source resonator to the connecting unit.

11. The apparatus of claim 1, further comprising:
a power converter configured to convert alternating current (AC) power of a voltage source to a direct current (DC) power.

12. The apparatus of claim 1, wherein the connecting unit comprises a hollow cylinder, and a cable passing through the inside of the hollow cylinder.

13. The apparatus of claim 12, wherein the hollow cylinder is formed of an insulative material.

14. The apparatus of claim 1, wherein the predetermined distance is adjustable thereby providing impedance matching between the source resonator and a target resonator that receives the resonance power transmission.

15. The apparatus of claim 1, wherein the source resonance unit includes an extension controller configured to adjust an effective charging radius of the source resonator defined as a minimal distance at which power transfer occurs.

16. The apparatus of claim 1, further comprising:
a supporting unit configured to support the apparatus.

17. A method of transmitting resonance power, the method comprising:
transmitting resonance power using a source resonator having a generally planar loop configuration defining a space therein, the source resonator being included in a roof of a wireless power transmission apparatus;
receiving by a target resonator positioned on a receiving unit the resonance power transmitted from the source resonator; and
adjusting a vertical distance between the roof of the apparatus and the receiving unit for coupling impedance matching between the source resonator and the target resonator.

18. The method of claim 17, wherein the source resonator is one of: square-shaped, rectangular-shaped, circle-shaped, triangle-shaped, octagon-shaped and polygon-shaped.

19. The method of claim 17, wherein the source resonator defines an effective charging radius of the source resonator as a minimal distance at which power transfer occurs.

20. The method of claim 17, wherein a target resonator that receives the resonance power transmission is positioned inside an effective charging radius of the source resonator defined as a minimal distance at which power transfer occurs.

21. The method of claim 17, further comprising:
adjusting an effective charging radius of the source resonator.

22. A roof-type charging apparatus using resonance power transmission, the apparatus comprising:
a source resonance unit included in a roof of the charging apparatus, the source resonance unit configured to transmit resonance power via a source resonator having a generally planar loop configuration and defining a space therein;
a receiving unit on which a target resonator is to be positioned to receive the resonance power transmitted from the source resonator;
a matching unit located in a predetermined area of a frame of the source resonator and configured to match, to a predetermined value, a coupling impedance between the source resonator and the target resonator that receives the resonance power transmission;
an input power unit configured to generate resonance power based on a resonance frequency, and to provide the resonance power to the source resonator;
a connecting unit configured to separate the source resonator and the receiving unit by a predetermined distance; and
a supporting unit connected to the input power unit and configured to support the roof-type charging apparatus,
wherein the matching unit further controls the connecting unit to control a vertical distance between the roof of the apparatus and the receiving unit for coupling impedance matching between the source resonator and the target resonator.

* * * * *